United States Patent
Molaro et al.

(10) Patent No.: US 9,558,206 B2
(45) Date of Patent: Jan. 31, 2017

(54) ASYMMETRIC DISTRIBUTED DATA STORAGE SYSTEM

(71) Applicants: Donald J. Molaro, Cupertino, CA (US); Adam M. Fried-Gintis, Lake Balboa, CA (US)

(72) Inventors: Donald J. Molaro, Cupertino, CA (US); Adam M. Fried-Gintis, Lake Balboa, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 144 days.

(21) Appl. No.: 13/776,461

(22) Filed: Feb. 25, 2013

(65) Prior Publication Data

US 2014/0244672 A1 Aug. 28, 2014

(51) Int. Cl.
G06F 17/30 (2006.01)
G06F 11/10 (2006.01)

(52) U.S. Cl.
CPC ..... *G06F 17/30212* (2013.01); *G06F 11/1076* (2013.01); *G06F 2211/1028* (2013.01)

(58) Field of Classification Search
None
See application file for complete search history.

(56) References Cited

U.S. PATENT DOCUMENTS

| 7,734,643 | B1 * | 6/2010 | Waterhouse | G06F 17/30067 |
| | | | | 707/770 |
| 2005/0283537 | A1 * | 12/2005 | Li et al. | 709/240 |
| 2010/0094974 | A1 * | 4/2010 | Zuckerman et al. | 709/219 |
| 2013/0339818 | A1 * | 12/2013 | Baker et al. | 714/763 |

OTHER PUBLICATIONS

Riley et al., "An Introduction to Reed-Solomon Codes: Principles, Architecture and Implementation", 4i2i Communications Ltd, 1998, accessed on Nov. 1, 2014 from: http://www.cs.cmu.edu/~guyb/realworld/reedsolomon/reed_solomon_codes.html.*
Dimakis et al., "Decentralized Erasure Codes for Distributed Network Storage", Journal, Submitted on Jun. 12, 2006, pp. 1-8.
Leong et al., "Symmetric Allocations for Distributed Storage", Journal, Submitted on Jul. 28, 2010, pp. 1-7.
(Continued)

*Primary Examiner* — Alex Gofman
*Assistant Examiner* — Umar Mian
(74) *Attorney, Agent, or Firm* — SoCal IP Law Group LLP; Mark A. Goldstein

(57) ABSTRACT

Asymmetric distributed replicated data storage systems and methods are described herein. The storage system includes zones that are independent, and autonomous. The zones include nodes that are independent and autonomous. The nodes include storage devices. When a data item is stored, it is partitioned into a plurality of data objects and a plurality of parity objects using erasure coding. The data objects and parity objects are spread across all nodes and zones in the storage system asymmetrically such that a first zone includes all of the data objects and no parity objects while the remaining zones include subsets of the data objects and all of the parity objects. The systems and methods provide for data resiliency while keeping the amount of storage space required relatively low.

22 Claims, 7 Drawing Sheets

(56) References Cited

OTHER PUBLICATIONS

Leong et al., "Distributed Storage Allocation Problems", Journal, Jun. 15-16, 2009, last accessed May 15, 2013, http://www.its.caltech.edu/~derekl/pub/2009_netcod_ldh.pdf, total of 6 pages.

Rodrigues et al., "High Availability in DHTs: Erasure Coding vs. Replication", journal, 4th International Workshop, IPTPS 2005, Ithaca, NY, USA, Feb. 24-25, 2005, last accessed May 15, 2013, http://iptps05.cs.cornell.edu/PDFs/CameraReady_223.pdf, total of 6 pages.

Xin et al., "Evaluation of Distributed Recovery in Large-Scale Storage Systems", paper in the Proceedings of the 13th IEEE International Symposium on High Performance Distributed Computing, Honolulu, HI, Jun. 2004, last accessed May 15, 2013, http://users.soe.ucsc.edu/~elm/Papers/hpdc04.pdf, total of 10 pages.

\* cited by examiner

ASYMMETRIC DISTRIBUTED DATA STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data stored in a distributed replicated data storage system and an improved method for storing and accessing data in a distributed replicated data storage system.

Description of the Related Art

A file system is used to store and organize computer data stored as electronic files. File systems allow files to be found, read, deleted, and otherwise accessed. File systems store files on one or more storage devices. File systems store files on storage media such as hard disk drives and silicon storage devices. In contrast, the system described herein involves data items stored as a plurality of objects in an object storage system. Object storage systems may provide a simpler instruction set and improved storage and access efficiencies compared to a traditional file system. Applications may store large numbers data items, for example documents, images, audio, videos, scientific data and other data items as a plurality of objects using an object storage system. Various applications may store large numbers of data items as objects using a distributed data storage system in which data is stored in at least two locations.

DETAILED DESCRIPTION

Environment

Figure 1:
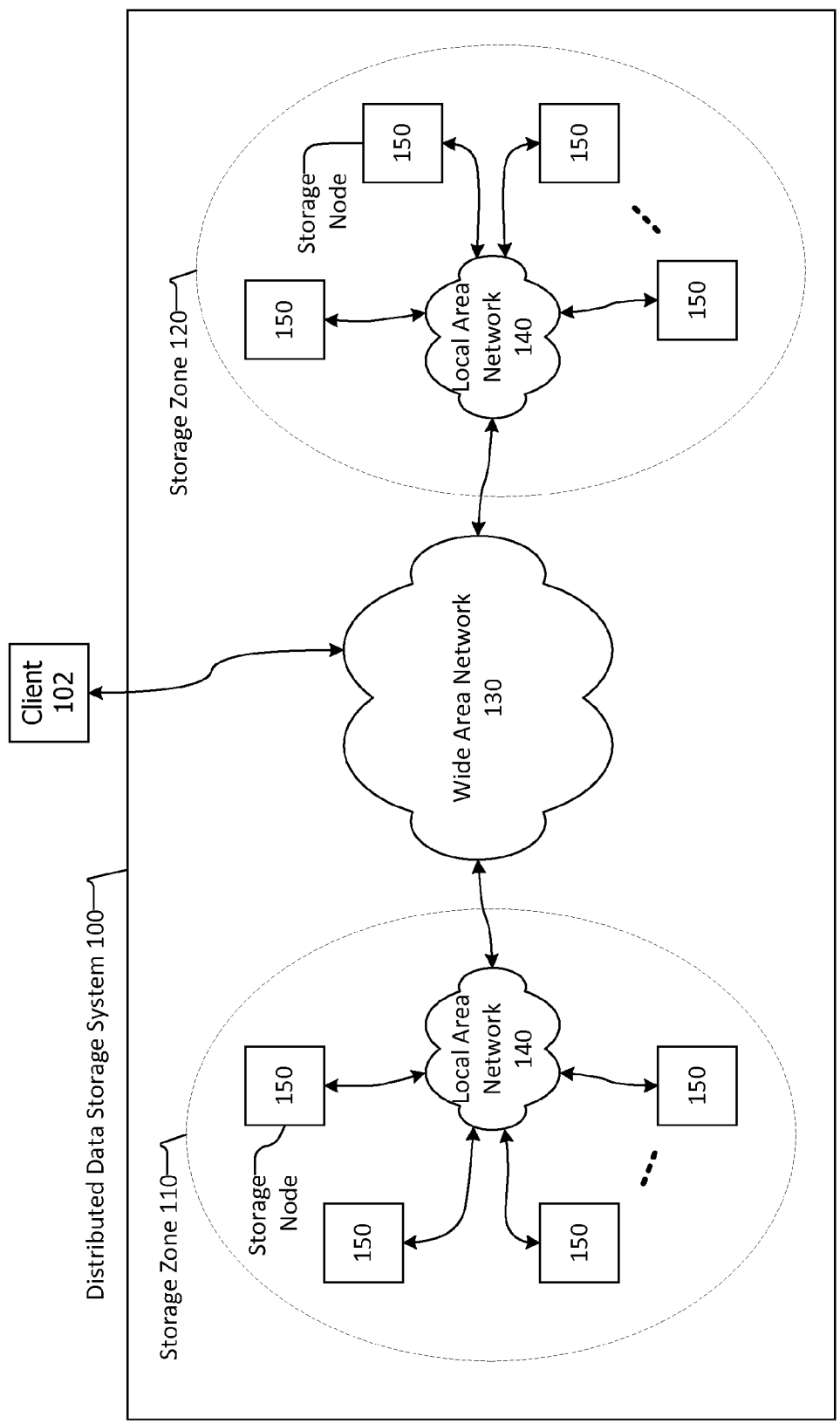
FIG. 1 is a block diagram of a distributed data storage system.

FIG. 1 is a block diagram of a distributed data storage system 100. The distributed replicated data storage system 100 includes at least two storage zones. The distributed replicated data storage system 100 includes multiple storage zones that are independent of one another, may be geographically dispersed and are in a peer-to-peer configuration. In the example shown, the distributed replicated data storage system 100 includes two storage zones, first storage zone 110 and second storage zone 120.

The storage zones 110 and 120 are separated geographically. The storage zones 110 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The term data as used herein includes a bit, byte, word, block, stripe or other unit of information. As used herein, the term data is inclusive of entire computer readable files or portions of a computer readable file. The data may include or represent text, numbers, data (for example, financial data, scientific data, consumer data), images, photographs, graphics, audio, video, computer programs, computer source code, computer object code, executable computer code, and/or a combination of these and similar information. A data item refers to a single computer readable file. A data item may be stored as a plurality of objects. Objects may include a plurality of sub-objects which are in and of themselves objects.

Many data intensive applications store a large quantity of data, these applications include scientific applications, newspaper and magazine websites (for example, nytimes.com and life.com), health care providers, scientific lab data capturing and analysis programs, video and film creation software, and consumer web based applications such as social networking websites (for example, FACEBOOK), photo sharing websites (for example, FLIKR), video sharing websites (for example, YOUTUBE) and music distribution websites (for example, ITUNES).

Figure 2:
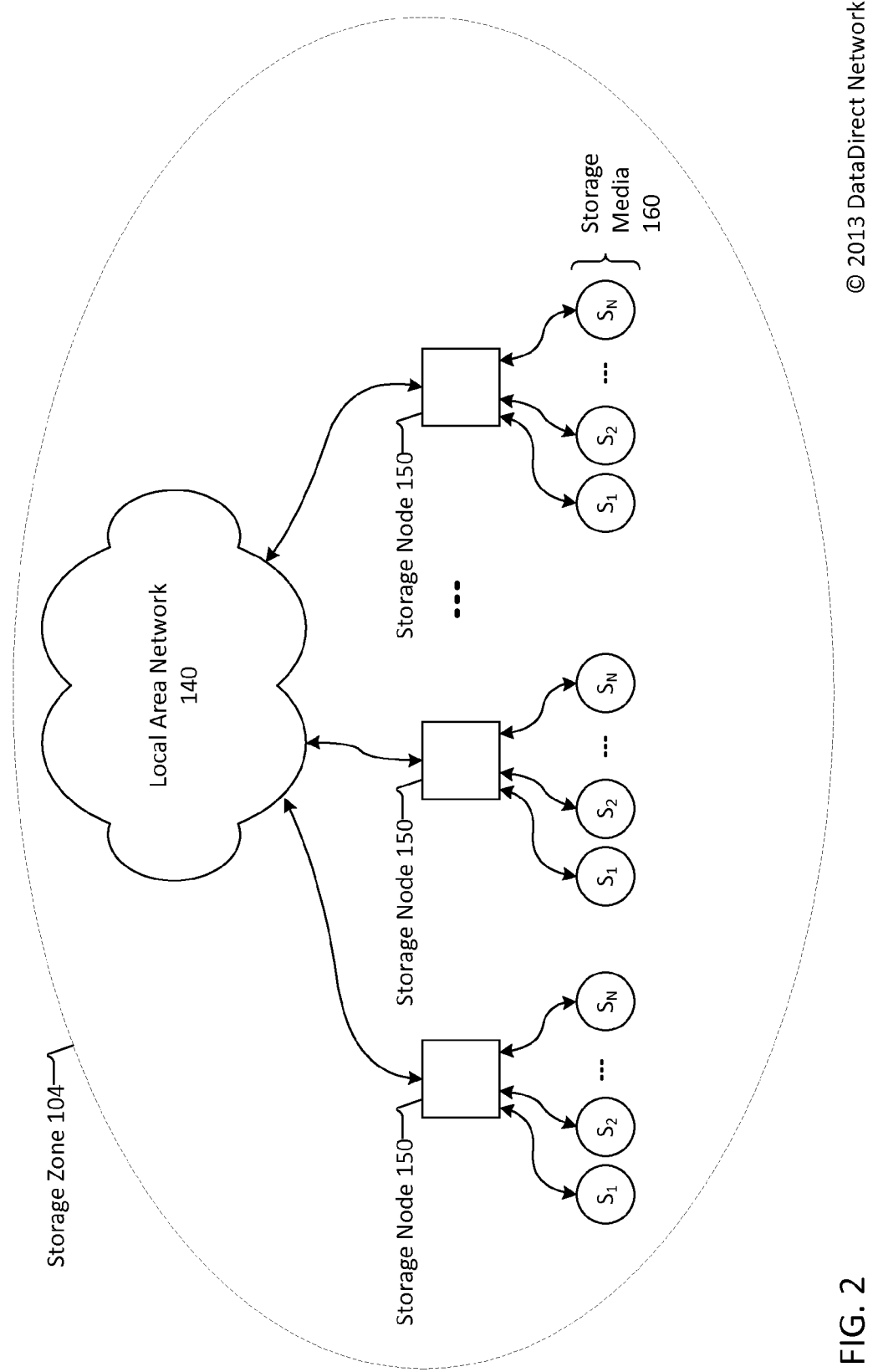
FIG. 2 is a block diagram of a storage zone included in a distributed data storage system.

FIG. 2 is a block diagram of a storage zone 104 included in a distributed data storage system. The storage zones 110 and 120 shown in FIG. 1 are examples of storage zone 104. The storage nodes 150 within a storage zone 104 may be connected via a local area network 140 by wire lines, optical fiber cables, wireless communication connections, and others, and may be a combination of these. The local area network 140 may include one or more networking devices such as routers, hubs, switches and the like.

Referring again to FIG. 1, one node in one of the storage zones may include an object management system and/or application program that automatically identifies and adapts to impairments in the storage nodes 150. That is, software in a node in the storage zone 110 may monitor and recognize multiple kinds of impairments, including, for example, storage node failures; storage device failures; storage nodes with diminished capacity such as one or more down or diminished drives; storage devices with diminished capacity such as bad blocks or sectors; other equipment failures; offline nodes; offline storage devices; missing data; impaired data; and other system anomalies. When the software in a node in the storage zone recognizes an impairment, the distributed data storage system may automatically adapt. In a related embodiment, the distributed data storage system 100 may include an application program that automatically identifies impairments in constituent storage zones and takes remedial action.

The storage zones 110, 120 and 104 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some actions are performed by a controller or computing device, and others by other controllers or computing devices within a storage zone.

A computing device as used herein refers to any device with a processor, memory and a storage device that may execute instructions such as software including, but not limited to, server computers, personal computers, portable computers, and laptop computers. The computing devices may run an operating system, including, for example, versions of the Linux, Unix, MS-DOS, Microsoft Windows, Solaris, Symbian, Android, Chrome, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 104 includes a plurality of storage nodes 150 which include a plurality of storage media 160. Each of the storage nodes 150 may include one or more server computers. Each of the storage nodes 150 may be an independent network attached storage (NAS) device or system. The term "storage media" is used herein to refer to any configuration of hard disk drives, solid-states drives, silicon storage devices, magnetic tape, or other similar storage media. Hard disk drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 500 Mbytes, 1 terabyte and 2 terabytes. Example hard disk drive specifications include Serial Attached Small Computer System Interface (SAS), Serial Advanced Technology Attachment (SATA), and others. An example storage node may include 16 one terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of standards, including, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, etc. network connections and may have an equal number of network interfaces to achieve this.

The techniques discussed herein are described with regard to storage media including, but not limited to, hard disk drives and solid-state drives. The techniques may be implemented with other readable and writable storage media.

As used herein, a storage device is a device that allows for reading from and/or writing to a storage medium. Storage devices include hard disk drives (HDDs), solid-state drives (SSDs), DVD drives, and flash memory devices. Storage media include magnetic media such as hard disks and tape, flash memory, and optical disks such as CDs, DVDs and BLU-RAY® discs.

According to the systems and methods described herein, data items are partitioned into smaller portions and stored as multiple objects among multiple storage media 160 in a storage node 150. Data items may be partitioned into smaller portions referred to as objects and stored among multiple storage nodes 150 in a storage zone. In one embodiment each object includes a storage policy identifier and a data portion. The object including its constituent data portion is stored among storage nodes and storage zones according to the storage policy specified by the storage policy identifier included in the object. Various policies may be maintained and distributed or known to the nodes in all zones in the distributed storage system. Policies define the replication and placement of data objects in the data storage system. Example policies include, full distribution, single copy, single copy to a specific zone, copy to all zone but a specified zone, and others. The policies may be stored on and distributed from a client 102 to the distributed replicated storage system 100 to all nodes in the storage system. A character (e.g., A, B, C, etc.) or number (e.g., 0, 1, 2, etc.) or combination of one or more characters and numbers (e.g., A1, AAA, A2, BC3, etc.) or other scheme may be associated with and used to identify each of the policies. The client 102 of the storage system 100 may be a computing device such as, for example, a personal computer, tablet, mobile phone, workstation or server.

Referring again to FIG. 1, the wide area network 130 may connect geographically separated storage zones. Each of the storage zones includes a local area network 140. The transfer of data between storage nodes in a storage zone is fast compared to communication over the wide area network 130.

Figure 3:
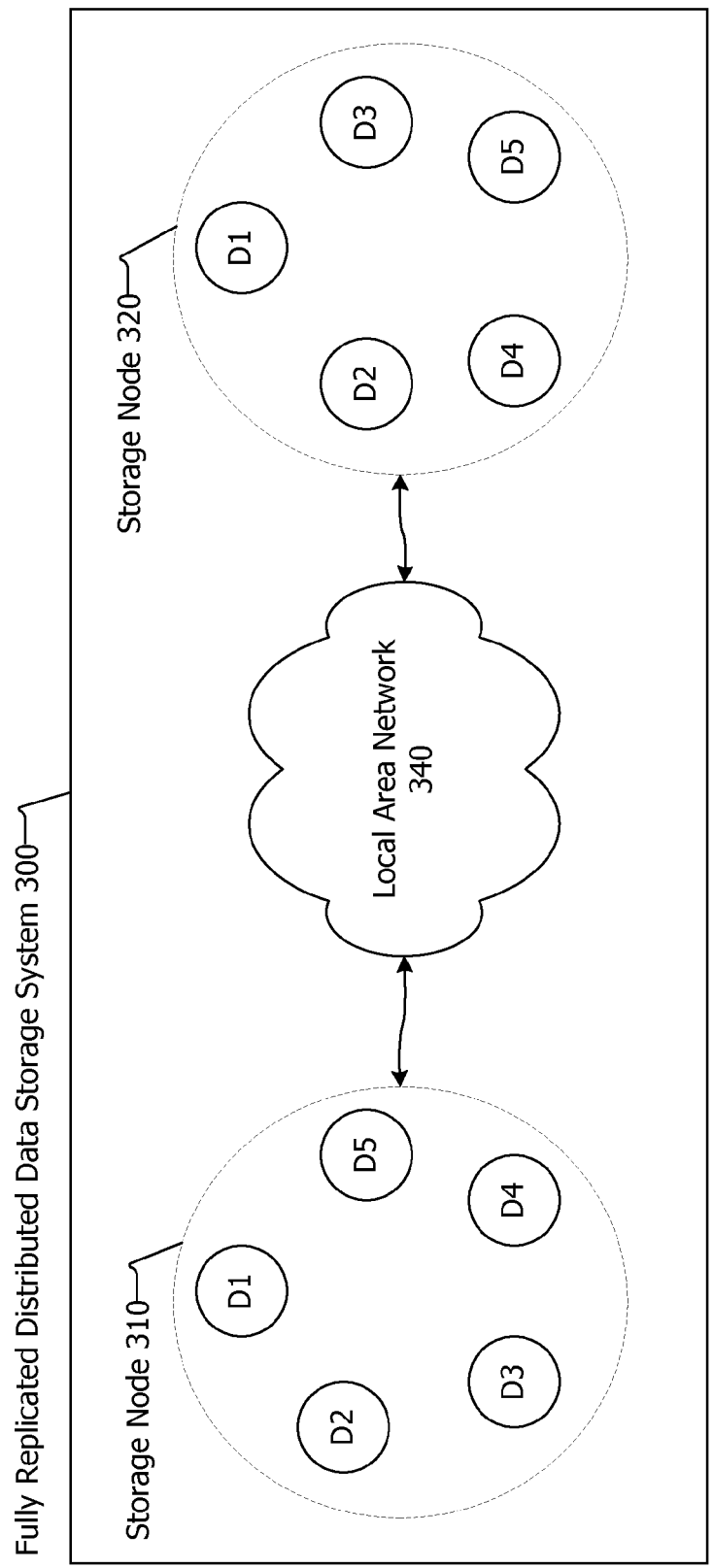
FIG. 3 is a block diagram of a first example fully replicated distributed data storage system.

Referring now to FIG. 3, a fully replicated distributed data storage system 300 is shown. In this configuration, all data is replicated among all storage zones such that copies of stored data are available from and accessible from all storage zones. This is referred to herein as a fully replicated storage system. As shown, a data item is partitioned into data objects D1 through D5. All data objects D1 through D5 are available in storage zones 310 and 320. Although two storage zones are shown, the system may have multiple storage zones. The data item stored as data objects D1 through D5 may represent one movie, one audio file, one book, or any portion, full or partial, of any data. In a fully replicated storage system, all stored data is accessed from any or all of the storage zones based on various system rules. In a fully replicated configuration, the storage zones 310 and 320 are replicated such that copies of data in both storage zones are the same.

Replication may be performed synchronously, that is, completed before the write operation is acknowledged; asynchronously, that is, the replicas may be written before, after or during the write of the first copy; or a combination of each.

Figure 4:
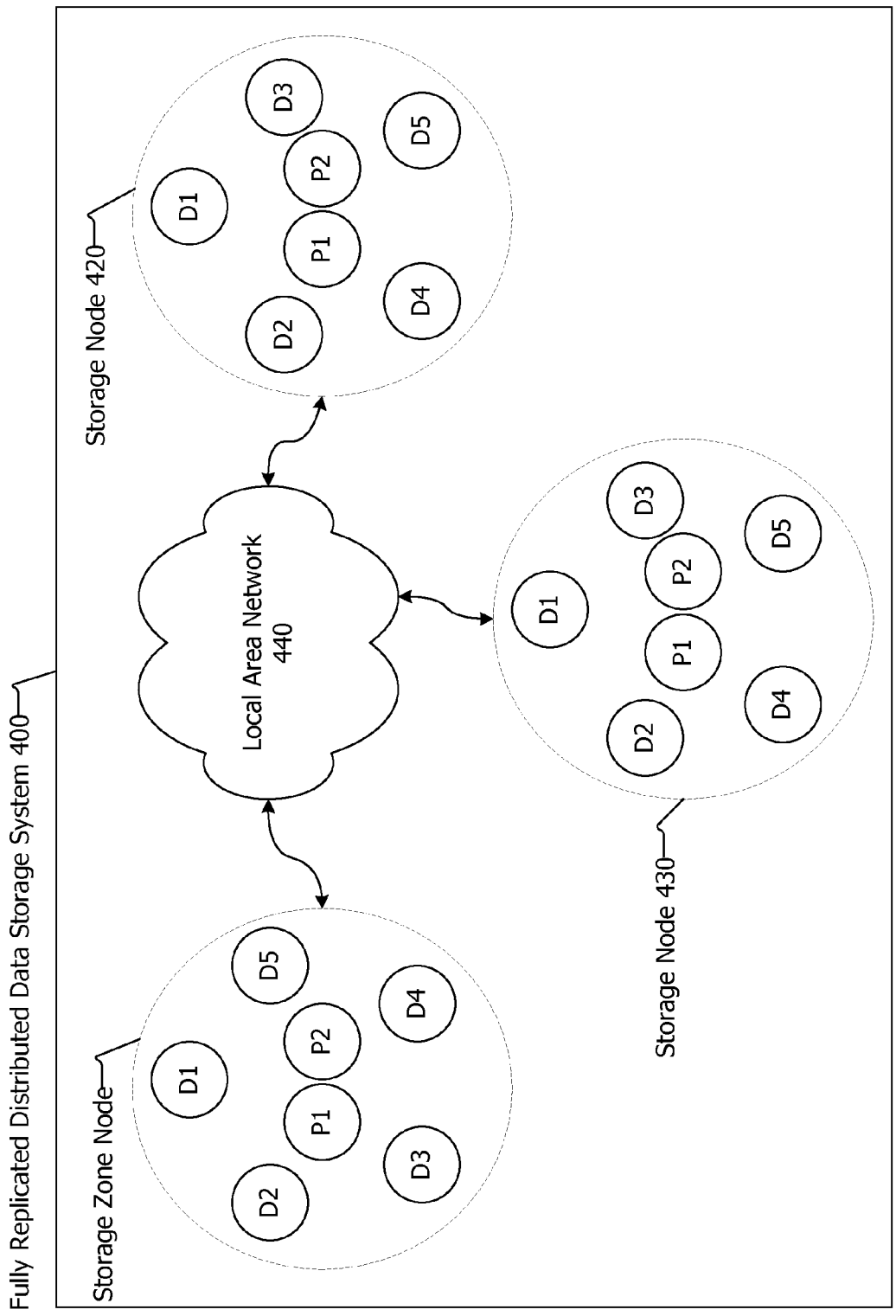
FIG. 4 is a block diagram of a second example fully replicated distributed data storage system.

FIG. 4 is a block diagram of an example fully replicated distributed data storage system with parity. The fully replicated distributed data storage system 400 includes multiple storage zones that are independent of one another, are geographically dispersed and are in a peer-to-peer configuration. In this example, a data item is partitioned into five pieces, data objects D1 through D5. The system also creates two parity objects P1 and P2 to allow for ready recreation of any of the data objects by use of a combination of five data objects and parity objects. This is particularly useful when one or more data objects become inaccessible. Data objects D1 through D5 and parity objects P1 and P2 are replicated and stored in all storage zones, namely storage zones 410 and 420. If the system included more storage zones, each of the data and parity objects would be stored in each of the storage zones, making the system fully replicated.

The creation of parity objects may be based upon a number of well-known erasure coding techniques. In one embodiment, the parity objects are created with the Reed-Solomon technique. See James S. Plank "Erasure Codes for Storage Applications," Tutorial, FAST-2005: 4th Usenix Conference on File and Storage Technologies San Francisco, Calif., December, 2005 and James S. Plank, "A Tutorial on Reed-Solomon Coding for Fault-Tolerance in RAID-like Systems," Software—Practice & Experience, 27(9), September, 1997, pp. 995-1012.

The property of interest for such erasure coding techniques is the ability to repair the loss of data objects with an equal number of parity objects using the technique. For example, the calculation of parity can be used as a simple erasure code. Consider the 8 bit string "10011100", with the addition of the parity bit of "1" (even parity). If the system presents the string "1001X100" with the parity bit of "1" and the parity coding is known to be even, the receiver can infer that the missing bit "X" is a "1". This technique can be generalized to correct as many errors in the stored data as there are parity. The system and methods described herein are dependent on this general property of parity erasure codes and not a specific algorithm or implementation.

Should one of the storage nodes in one of the storage zones become impaired, become unavailable, become inaccessible or go down, the system may recreate the data by using available data objects along with parity objects within the zone. Should one of the storage nodes in one of the storage zones become impaired, become unavailable, become inaccessible or go down such that multiple data objects are not accessible, the system may recreate the data objects by using available data objects along with parity objects within the zone as well as from other zones. To recreate the data item, a combination of any five objects is needed. The system 400 is extremely resilient, but such resiliency comes at a high cost in the form of the use of large quantities of data as each data object and each parity object are duplicated as many times as three are zones. Referring to the example shown in FIG. 4, as the data item was partitioned into five data objects and two parity object, in the fully replicated storage system 400, the amount of storage space required for a three zone system would be twenty one objects. According to this fully replicated parity system, to store a data item partitioned in to five objects results in additional storage of space needed to store 16 additional objects.

Full replication can result in increased storage costs, particularly when there are multiple zones and all data is replicated at all zones. Although this configuration provides for resiliency, it may be costly monetarily and may be too costly monetarily for some. That is, the monetary cost of the constituent storage media required for full replication may be too high.

In the asymmetric distributed data storage system described herein, when writing data to a storage zone, the data may be replicated in one or more additional storage zones to provide for redundancy such that access to data is possible when a zone goes down or is impaired or unreachable, without the need for full or symmetric replication. The asymmetric distributed data storage system does not require that each zone have a full copy of all data objects. The techniques described herein result in a lower cost resilient data storage system. The lower cost is achieved through the use of smaller capacity storage zones (and fewer or smaller capacity storage devices in those storage zones). Because of the monetary cost of data storage devices, the resilient replication system described herein reduces the amount of data stored, requiring a smaller storage capacity which reduces storage media costs.

Figure 5:
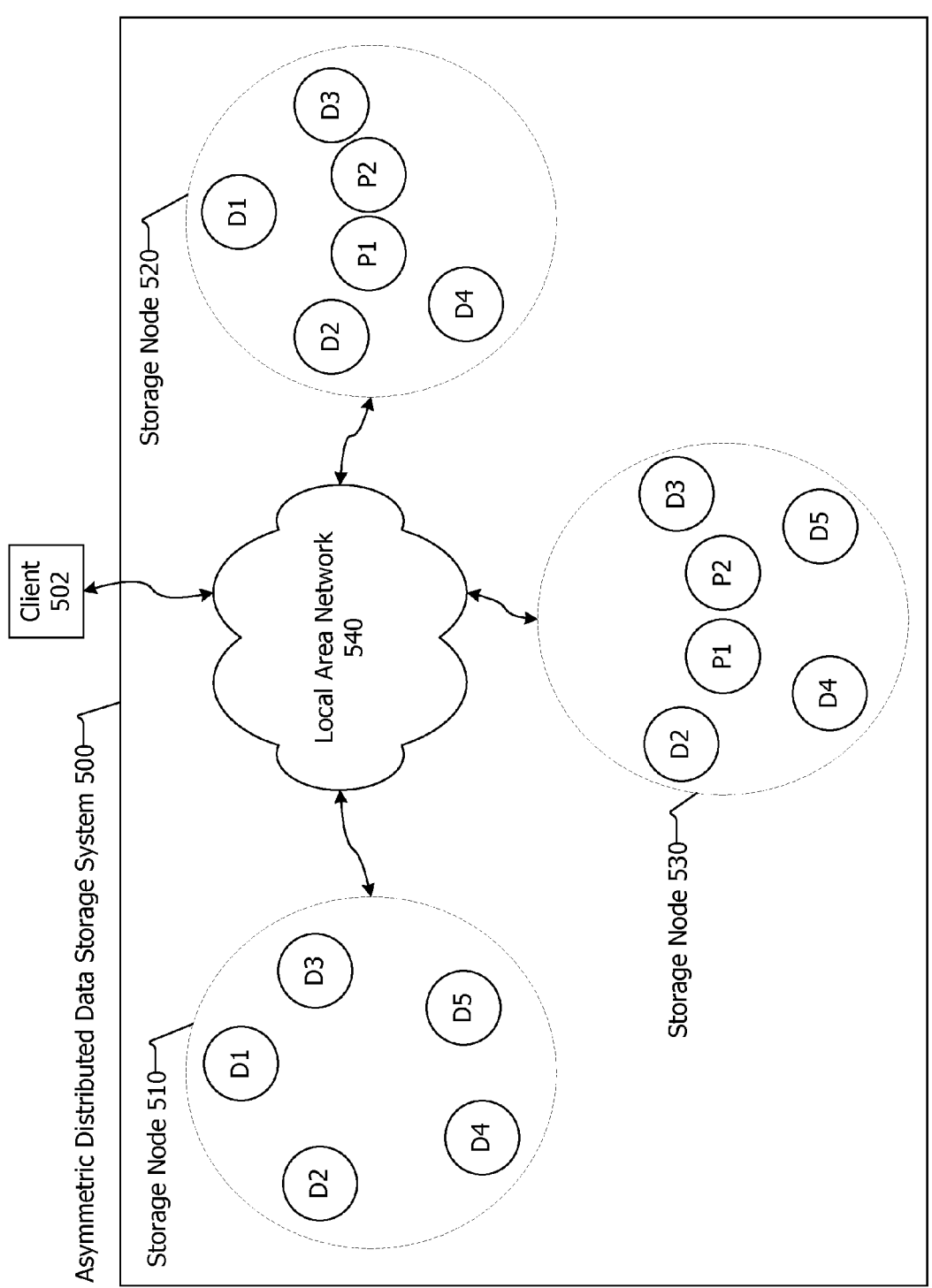
FIG. 5 is a block diagram of an example asymmetric distributed data storage system.

Referring now to FIG. 5, a block diagram of an example asymmetric distributed data storage system is shown. The asymmetric distributed data storage system 500 includes multiple storage zones that are independent of one another, are geographically dispersed and are in a peer-to-peer configuration connected for communication over a wide area network 540. A client computing device 502 coupled with the wide area network 540 may be used to specify the configuration of the asymmetric distributed data storage system 500 and may promulgate policies or storage criteria for the nodes in the system 500.

According to the asymmetric storage techniques herein, the system partitions the data item into five data objects and creates two parity objects. The parity objects are created using a well-known or proprietary erasure coding technique. One zone in the asymmetric storage system stores five data objects of the data item and none of the parity objects, while each of the other zones includes a subset of the data objects, namely four out of five of the data objects as well as both of the parity objects. In the storage zones with four data objects, the missing data object from these zones rotates, alternates or differs such that the subset of data objects differs from zone to zone. In one embodiment, all of the data objects are equally represented among each of the zones such that the missing data object is equally selected for exclusion.

In the example shown in FIG. 5, a data item is partitioned into five pieces, data objects D1 through D5. Parity objects P1 and P2 are crated using erasure coding of the five data objects. All data objects, data objects D1 through D5, are stored in storage zone 510; a first subset of four data objects, data objects D1 through D4, and parity objects P1 and P2 are stored in storage zone 520; and a second subset of four data objects, data objects D2 through D5 and parity objects P1 and P2 are stored in storage zone 530.

Should one of the storage nodes in one of the storage zones become impaired, become unavailable, become inaccessible or go down, the system may recreate the data by using available data objects along with parity objects. When the data and parity objects for the data items are distributed asymmetrically among the three zones as shown, the system may recreate the data item from any five different objects from the seven total objects, namely the five data objects and the two parity objects. For example, if data objects D1 and D2 in zone 510 are down or inaccessible, the data objects D3, D4, D5 from zone 510 may be combined with D1 and D2 from zone 520 to recreate the data item. In another example and if data objects D1 and D2 in zone 510 are down or inaccessible, the data objects D3, D4, D5 from zone 510 may be combined with D2 and P2 from zone 530 to recreate the data item.

Referring to the examples shown in FIGS. 4 and 5, the amount of storage space required for a three zone system would be three times the size of the data objects and parity objects. System 400 shown in FIG. 4 requires space for 21 objects. According to the asymmetric distributed data storage system described regarding FIG. 5, the system 500 includes one zone with five data objects and two zones each with four data objects and two parity objects. The system 500 shown in FIG. 5 requires space for 17 objects. The asymmetric system described herein results in a savings of almost 20% of the storage space required in a fully duplicated system while providing for resiliency and access to data in the three zones examples shown.

According to the asymmetric storage system described herein, to store a data item partitioned in to five objects results in additional storage of space needed to store 12 additional objects. When compared to the fully replicated parity system described above, there is a savings of the spaced needed to store four objects.

When the system is scaled to large applications, the reduction in storage needed may result in significant monetary cost savings while providing the user a desired level of resiliency and accessibility.

The software running on a controller or computing device in storage zone 510 may monitor the health of the other storage zones 520 and 530 and/or the storage media in the storage zones 520 and 530. When an impending or actual problem or failure is detected in the storage zones 520 or 530, the storage zone 510 may identify this situation as an access alert. After identifying an access alert, the system uses data objects and parity objects to recreate the data. The access alert may be identified by a node, and the node may recreate the data item by sending requests for data objects and parity objects to other nodes in other zones, if necessary.

In this way a customer of the asymmetric distributed data storage system may receive the reliability or service level desired that approaches the service level of a fully replicated parity storage system at a much lower cost.

The example shown in and described regarding FIG. 4 involves three storage zones and a single data item partitioned into nine objects. The techniques described herein apply to storage systems with multiple storage zones, regardless of the number of storage zones. The techniques described herein apply to any sized data item. The techniques described herein apply to systems with multiple data items. The techniques described herein require that the total number of data objects and parity objects can be divided evenly among the zones in the particular configuration of the resilient distributed replicated data storage system. The techniques described herein optionally allow for multiple copies of data objects and parity objects to be stored to meet the divided equally requirement among storage zones as well as to increase the resiliency of the stored object.

Description of Processes

The method used in the asymmetric distributed data storage system may be described as taking a data item, partitioning it into pieces known as data objects, calculating parity information known as parity objects and distributing the objects among storage zones asymmetrically. The system allows for the spreading of data objects and parity objects among multiple storage zones to meet the availability and durability requirements of a particular application or customer. The spreading of the objects among zones is performed so that the durability of the data item is ensured while the storage used to achieve the desired service level is reduced. In one version of the system, the system may duplicate parity and data objects to increase the resiliency of the stored item according to the policy requirements.

Figure 6:
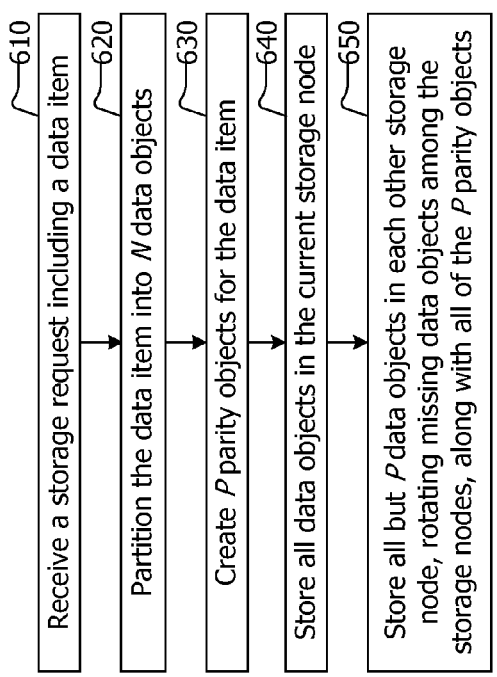
FIG. 6 is a flow chart of the actions taken to store or put data in an asymmetric distributed data storage system.

Referring now to FIG. 6, a flow chart of the actions taken to store or put data in an asymmetric distributed data storage system is shown. To store or put a data item, the system receives a storage request that includes a data item (or reference or link to a data item) and may include storage criteria, as shown in block 610. The storage criteria may, in different embodiments specify the storage policy for the data item by a code or name, or may include specific distribution instructions for the data item. The specific distribution instruction may include the exact number of data objects and parity objects the data item for the data item. The data item is partitioned in to N data objects and P parity objects for the data item where N is five and P is two. The system partitions the data item into M data objects, as shown in block 620. The system creates P parity objects for the data item, as shown in block 630. The partitioning into data objects and creating parity objects is achieved according to erasure coding techniques by one or more nodes in a zone in the asymmetric distributed data storage system.

According to erasure coding, the data item is divided into n pieces and recoded into n+p total objects, namely n data objects and p parity objects, such that there will be t total objects. According to erasure coding, t>n>p. The key property of erasure coding is that the original item can be reconstructed from any n objects from the combination of data objects and parity objects, where the combined size for the n objects is equal or greater than the original data item size. For example, referring to FIG. 5, when the data item is partitioned into five data objects n and two parity objects p, the total number of objects t is seven and the number of objects needed to recreate the original data item is n or five. The erasure coding used may be according to the Reed-Solomon techniques or other suitable well-known or proprietary techniques.

Referring again to FIG. 6, the system then stores all of the data objects in a current storage zone, as shown in block 640. The system stores all but P of the data objects in each other storage zone, rotating missing data objects among the other zones, and stores the P parity objects in each of the other zones, as shown in block 650. In this way differing subsets of data objects are stored among the zones while all of the parity objects are stored at each zone. In one embodiment the system performs the actions in blocks 650 and 660 concurrently when synchronized replication is required. The system performs the actions in blocks 650 and 660 sequentially when asynchronous replication is sufficient. The system stores the data objects and parity objects among the storage zones as described herein and shown in FIG. 5 so that when one zone goes down, the system can still provide the data item when requested.

Figure 7:
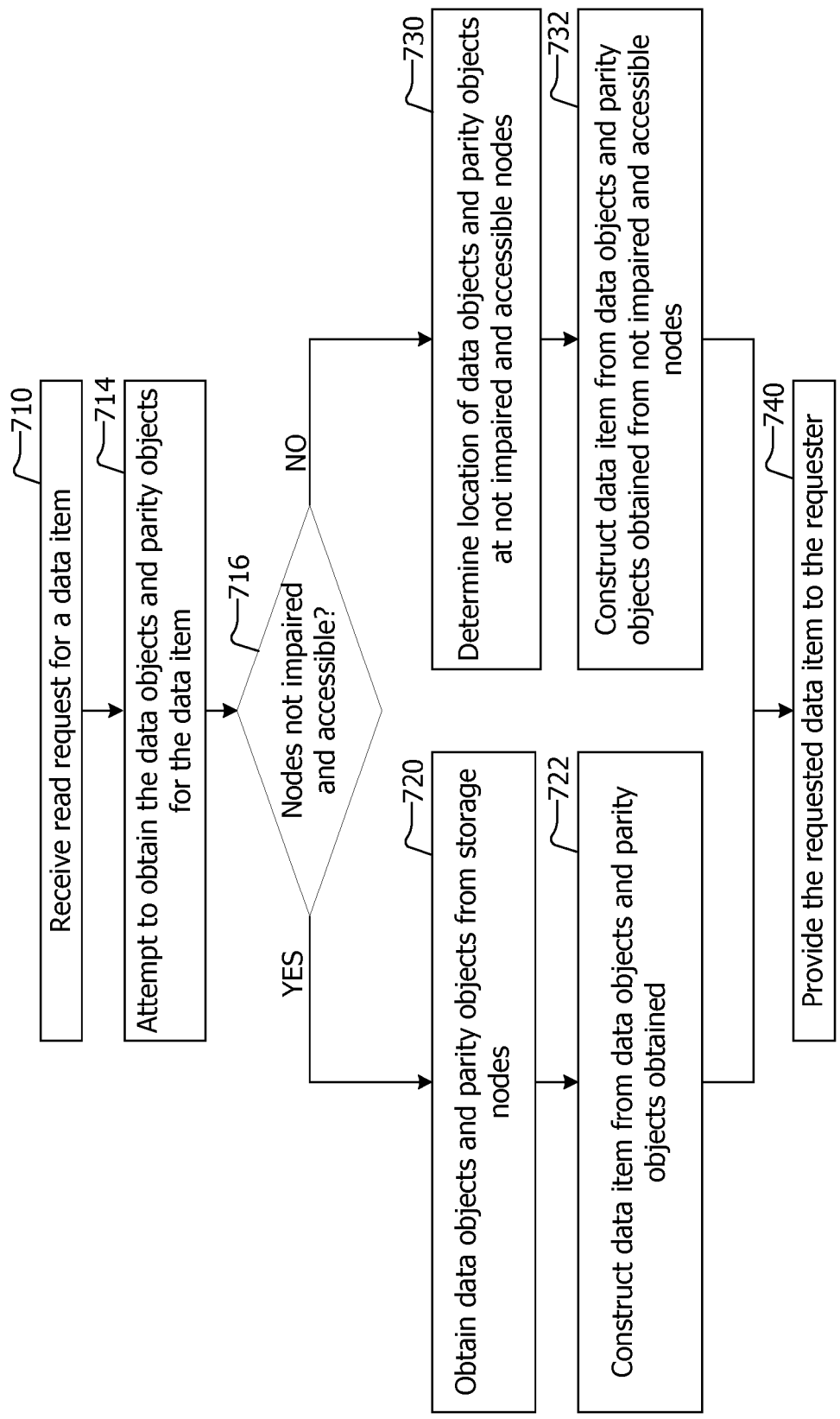
FIG. 7 is a flow chart of the actions taken to read or get data included in an asymmetric distributed data storage system.

Referring now to FIG. 7, a flow chart of the actions taken to read or get data included in an asymmetric distributed data storage system is shown. The system receives a read request for a data item, as shown in block 710. The system determines the location of data objects and parity objects at lowest latency nodes needed to construct the data item, as shown in block 712. That is, the system locates the constituent objects to reconstruct the requested data item by referring to a latency map. The system attempts to reconstruct the data item as quickly as possible.

Each node as it operates tracks the time it takes for operations with other nodes. This information about timing concerning operations with other nodes is stored in a list of nodes that includes the historical time to reach other nodes or perform operations involving other nodes. This list of nodes and times may be referred to as a latency map or map of latencies.

When attempting to reconstruct the data item as quickly as possible, the system may refer to the map of latencies to other nodes in the system. The object identifier includes the nodes where each object may be located. The system uses these two pieces of information, the node and the latency to the node, to attempt to retrieve sufficient objects to reconstruct the item in the shortest time. The system then attempts to obtain the data objects and parity objects for the data item, as shown in block 714.

If one or more lowest latency nodes at which data objects or parity objects are stored are either impaired or inaccessible as shown in block 716, the system determines the location of data objects and parity objects at not impaired and accessible nodes needed to construct the data item by referring to the reassembly information and obtains the objects, as shown in block 730. These may be referred to as alternate nodes, that is, the nodes that are not lowest latency but that are not impaired and are available. The system constructs the data item from data objects and parity objects obtained from not impaired and accessible nodes, as shown in block 732, that is, the alternate nodes. The system then constructs the data item from data objects and parity objects obtained, as shown in block 732. The system provides the requested data item to the requester, as shown in block 740.

When the system attempts to obtain the data objects and parity objects for the data item and all the nodes at which the data objects are stored are not impaired and are accessible, the system obtains the data objects from lowest latency nodes, as shown in block 720. The system then constructs the data item from data objects and parity objects obtained, as shown in block 722. The system provides the requested data item to the requester, as shown in block 740.

The methods described above and shown in FIGS. 6 and 7 may be performed by and managed by a node included in a zone in a distributed replicated data storage system in which the independent nodes communicate with each other. In another embodiment, the methods described above and shown in FIGS. 6 and 7 may be performed by and managed by an independent computing device or controller in a storage zone in a resilient distributed replicated data storage system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage system comprising:
   a plurality of storage zones, each storage zone comprising a plurality of nodes wherein each node comprises a plurality of storage devices and a controller, the controller including a processor and memory
   a first node of a plurality of nodes included in a first zone of the plurality of zones, the first node having instructions which when executed cause a first processor included in a first controller in the first node to perform actions including:
   receiving a storage request from a client of the system to store a data item, the storage request including a data item reference and storage criteria
   partitioning the data item into a plurality of data objects according to distribution instructions included in the storage criteria, wherein each data object includes a storage policy identifier and a data portion and the storage policy identifier defines replication of the data object among the storage zones of the data storage system
   creating a plurality of parity objects according to the distribution instructions included in the storage criteria
   storing all of the data objects in the first storage zone
   storing a first subset of the data objects and all of the parity objects in a second storage zone
   storing a second subset of the data objects and all of the parity objects in a third storage zone
   wherein the second subset of the data objects and the first subset of the data objects have partly different constituent data objects according to the storage criteria
   maintaining a latency map that includes a time for each node to reach other nodes in the storage zones.

2. The system of claim 1 wherein the storage devices are selected from the group including hard disk drives and solid state storage devices.

3. The system of claim 1 wherein the partitioning the data item into a plurality of data objects and the creating a plurality of parity objects are achieved using a parity generating erasure coding scheme.

4. The system of claim 3 wherein the parity generating erasure coding scheme is Reed-Solomon encoding.

5. The system of claim 1 wherein the plurality of parity objects is two and the plurality of data objects is five.

6. The system of claim 5 wherein the first subset and second subset of the data objects each include four of the five data objects.

7. The system of claim 1 wherein the first storage zone, the second storage zone and the third storage zone are geographically separate.

8. The system of claim 1 wherein the first node has further instructions which when executed cause the first processor to perform further actions including:
   receiving a read request for the data item
   identifying lowest latency nodes where data objects for the data item are stored by referring to the latency map
   attempting to obtain data objects and parity objects to reconstruct the data item from the lowest latency nodes
   when the lowest latency nodes are not impaired and accessible, constructing the data item from the data objects and parity objects at the lowest latency nodes
   when one of the lowest latency nodes is either impaired or not accessible, constructing the data item from the data objects and parity objects obtained in part from at least one alternative node, wherein alternative nodes are nodes that are not lowest latency, are not impaired and are available
   providing the requested data item to a requester.

9. A method comprising:
   receiving a storage request to store a data item, the storage request including a data item reference and storage criteria
   partitioning the data item into a plurality of data objects and creating a plurality of parity objects using parity generating erasure coding, wherein the plurality of data objects is five and the plurality of parity objects is two and wherein each data object includes a storage policy identifier and a data portion
   storing all of the data objects in a first storage zone
   storing a first subset of the data objects and all of the parity objects in a second storage zone
   storing a second subset of the data objects and all of the parity objects in a third storage zone
   wherein the second subset of the data objects and the first subset of the data objects have partly different constituent data objects according to the storage criteria
   maintaining a latency map that includes a time to reach other nodes from each node in the storage zones.

10. The method of claim 9 wherein the first storage zone and second storage zone include a plurality of storage devices, the storage devices selected from the group including hard disk drives and solid state storage devices.

11. The method of claim 9 wherein the first storage zone, the second storage zone and the third storage zone are geographically separate.

12. The method of claim 9 wherein the parity generating erasure coding is Reed-Solomon encoding.

13. The method of claim 9 wherein the first subset and second subset of data objects each include four of the five data objects.

14. The method of claim 9 further comprising:
   receiving a read request for the data item
   identifying lowest latency nodes where data objects and parity objects for the data item are stored in the first storage zone, the second storage zone and the third storage zone by referring to the latency map
   attempting to obtain data objects and parity objects to reconstruct the data item from the lowest latency nodes
   when the lowest latency nodes are not impaired and accessible, constructing the data item from the data objects and parity objects at the lowest latency nodes
   when one of the lowest latency nodes is either impaired or not accessible, constructing the data item from the data objects and parity objects obtained in part from at least one alternative node, wherein alternative nodes are nodes that are not lowest latency, are not impaired and are available
   providing the requested data item to a requester.

15. A data storage system comprising:
   a plurality of storage zones, each storage zone comprising a plurality of nodes wherein each node comprises a plurality of storage devices and a controller, the controller including a processor and memory
   a first node of a plurality of nodes included in a first zone of the plurality of zones, the first node having instructions which when executed cause a first processor included in a first controller in the first node to perform actions including:
   receiving a storage request from a client of the system to store a data item, the storage request including a data item reference and storage criteria partitioning the data item into a plurality of data objects according to distribution instructions included in the storage criteria and creating a plurality of parity objects according to distribution instructions included in the storage criteria, wherein the plurality of parity objects is two and the plurality of data objects is five, wherein each data object includes a storage policy identifier and a data portion storing all of the data objects in the first storage zone storing subsets of four of the five data objects and all of the parity objects in the other storage zones wherein the subsets of the data objects have differing constituent data objects among the storage zones according to the storage policy identifiers in the data objects maintaining a latency map that includes a time to reach other nodes from each node in the storage zones.

16. The system of claim 15 wherein the storage devices are selected from the group including hard disk drives and solid state storage devices.

17. The system of claim 15 wherein the partitioning the data item into a plurality of data objects and the creating a plurality of parity objects are achieved using a parity generating erasure coding scheme.

18. The system of claim 15 wherein the first node has further instructions which when executed cause the first processor to perform further actions including:

receiving a read request for the data item attempting to obtain data objects and parity objects to reconstruct the data item from lowest latency nodes among the storage zones when the lowest latency nodes are not impaired and accessible, constructing the data item from the data objects and parity objects at the lowest latency nodes when one of the lowest latency nodes is either impaired or not accessible, constructing the data item from the data objects and parity objects obtained in part from at least one alternative node, wherein alternative nodes are nodes that are not lowest latency, are not impaired and are available providing the requested data item to a requester.

19. A method comprising:

receiving a storage request to store a data item, the storage request including a data item reference and storage criteria partitioning the data item into a plurality of data objects and creating a plurality of parity objects, wherein each data object includes a storage policy identifier specified in the storage criteria and a data portion and wherein the plurality of parity objects is two and the plurality of data objects is five storing all of the data objects in the first storage zone of a plurality of storage zones storing subsets of four of the five data objects and all of the parity objects in at least some the other storage zones, wherein each of the subsets of the data objects have partly differing constituent data objects from other subsets according to the storage criteria maintaining a latency map that includes a time to reach other nodes from each node in the storage zones.

20. The system of claim 19 wherein the storage zones each include a plurality of storage devices, the storage devices selected from the group including hard disk drives and solid state storage devices.

21. The system of claim 19 wherein the partitioning the data item into a plurality of data objects and the creating a plurality of parity objects are achieved using a parity generating erasure coding scheme.

22. The method of claim 19 further comprising:

receiving a read request for the data item identifying lowest latency nodes where data objects and parity objects for the data item are stored by referring to the latency map attempting to obtain data objects and parity objects to reconstruct the data item from the lowest latency nodes among the storage zones when the lowest latency nodes are not impaired and accessible, constructing the data item from the data objects and parity objects at the lowest latency nodes when one of the lowest latency nodes is either impaired or not accessible, constructing the data item from the data objects and parity objects obtained in part from at least one alternative node, wherein alternative nodes are nodes that are not lowest latency, are not impaired and are available providing the requested data item to a requester.

* * * * *